US008399096B2

(12) United States Patent
Hausmann et al.

(10) Patent No.: US 8,399,096 B2
(45) Date of Patent: *Mar. 19, 2013

(54) HIGH-CLARITY IONOMER COMPOSITIONS AND ARTICLES COMPRISING THE SAME

(75) Inventors: Karlheinz Hausmann, Auvernier (CH); Richard Allen Hayes, Beaumont, TX (US); Steven C. Pesek, Orange, TX (US); W Alexander Shaffer, Orange, TX (US); Charles Anthony Smith, Vienna, WV (US)

(73) Assignee: E I du Pont de Nemours and Company, Wilmington, DE (US)

(*) Notice: Subject to any disclaimer, the term of this patent is extended or adjusted under 35 U.S.C. 154(b) by 389 days.

This patent is subject to a terminal disclaimer.

(21) Appl. No.: 12/610,678

(22) Filed: Nov. 2, 2009

(65) Prior Publication Data

US 2010/0112253 A1  May 6, 2010

Related U.S. Application Data

(60) Provisional application No. 61/110,302, filed on Oct. 31, 2008, provisional application No. 61/117,645, filed on Nov. 25, 2008.

(51) Int. Cl.
*B32B 17/10* (2006.01)
*B32B 27/32* (2006.01)
*B32B 15/08* (2006.01)
*B32B 27/36* (2006.01)
*C08F 20/06* (2006.01)

(52) U.S. Cl. ........ 428/412; 428/523; 428/441; 428/461; 526/317.1

(58) Field of Classification Search .................. 428/412, 428/523, 441, 461; 526/317.1
See application file for complete search history.

(56) References Cited

U.S. PATENT DOCUMENTS

| | | | |
|---|---|---|---|
| 2,897,183 A | 7/1959 | Christl et al. |
| 3,328,367 A | 6/1967 | Rees |
| 3,344,014 A | 9/1967 | Rees |
| 3,404,134 A | 10/1968 | Rees |
| 3,471,460 A | 10/1969 | Rees |
| 3,762,988 A | 10/1973 | Clock et al. |
| 4,173,669 A | 11/1979 | Ashida et al. |
| 4,619,973 A | 10/1986 | Smith, Jr. |
| 4,663,228 A | 5/1987 | Bolton et al. |
| 4,668,574 A | 5/1987 | Bolton et al. |
| 4,714,253 A | 12/1987 | Nakahara et al. |
| 4,732,944 A | 3/1988 | Smith, Jr. |
| 4,799,346 A | 1/1989 | Bolton et al. |
| 4,857,258 A | 8/1989 | Georges et al. |
| 4,906,703 A | 3/1990 | Bolton et al. |
| 4,937,035 A | 6/1990 | Richter |
| 4,944,906 A | 7/1990 | Colby et al. |
| 4,968,752 A | 11/1990 | Kawamoto et al. |
| 5,002,820 A | 3/1991 | Bolton et al. |
| 5,028,674 A | 7/1991 | Hatch et al. |
| 5,094,921 A | 3/1992 | Itamura et al. |
| 5,344,513 A | 9/1994 | Takenaka |
| 5,387,635 A | 2/1995 | Rowland et al. |
| 5,428,162 A | 6/1995 | Nesvadba |
| 5,428,177 A | 6/1995 | Nesvadba |
| 5,439,227 A | 8/1995 | Egashira et al. |
| 5,452,898 A | 9/1995 | Yamagishi et al. |
| 5,476,553 A | 12/1995 | Hanoka et al. |
| 5,478,402 A | 12/1995 | Hanoka et al. |
| 5,553,852 A | 9/1996 | Higuchi et al. |
| 5,580,057 A | 12/1996 | Sullivan et al. |
| 5,733,382 A | 3/1998 | Hanoka |
| 5,741,370 A | 4/1998 | Hanoka |
| 5,752,889 A | 5/1998 | Yamagishi et al. |
| 5,759,698 A | 6/1998 | Tanuma et al. |
| 5,762,720 A | 6/1998 | Hanoka et al. |
| 5,763,062 A | 6/1998 | Smith et al. |
| 5,782,703 A | 7/1998 | Yamagishi et al. |
| 5,782,707 A | 7/1998 | Yamagishi et al. |
| 5,788,890 A | 8/1998 | Grey et al. |
| 5,803,833 A | 9/1998 | Nakamura et al. |
| 5,807,192 A | 9/1998 | Yamagishi et al. |
| 5,895,721 A | 4/1999 | Naoumenko et al. |
| 5,958,534 A | 9/1999 | Marbler et al. |
| 5,973,046 A | 10/1999 | Chen et al. |
| 5,986,203 A | 11/1999 | Hanoka et al. |
| 6,011,115 A | 1/2000 | Miharu et al. |
| 6,114,046 A | 9/2000 | Hanoka |
| 6,150,028 A | 11/2000 | Mazon |
| 6,179,732 B1 | 1/2001 | Inoue et al. |

(Continued)

FOREIGN PATENT DOCUMENTS

CA 893216 A1 2/1972
DE 4316611 A1 11/1993

(Continued)

OTHER PUBLICATIONS

D3418-08 "Standard Test Method for Transition Temperatures and Enthalpies of Fusion and Crystallization of Polymers by Differential Scanning Calorimetry", Dec. 2008, p. 1-8.*

(Continued)

*Primary Examiner* — Michael M Bernshteyn
(74) *Attorney, Agent, or Firm* — Maria M. Kourtakis; Kelly Law Registry; Tong T. Li (57) ABSTRACT

An ionomer composition comprises an ionomer that is the neutralized product of a precursor acid copolymer. The precursor acid copolymer comprises copolymerized units of an α-olefin having 2 to 10 carbon atoms and about 20 to about 30 wt %, based on the total weight of the precursor acid copolymer, of copolymerized units of an α,β-ethylenically unsaturated carboxylic acid having 3 to 8 carbon atoms; a melt flow rate of about 10 to about 4000 g/10 min; and, when neutralized to a level of about 40% to about 90% and when comprising counterions that consist essentially of sodium cations, the precursor acid copolymer produces a sodium ionomer that has a melt flow rate of about 0.7 to about 25 g/10 min and a freeze enthalpy that is not detectable or that is less than about 3.0 j/g. Further provided are articles comprising the ionomer composition.

20 Claims, 2 Drawing Sheets

U.S. PATENT DOCUMENTS

| | | | |
|---|---|---|---|
| 6,187,448 | B1 | 2/2001 | Hanoka et al. |
| 6,187,845 | B1 | 2/2001 | Renz et al. |
| 6,191,199 | B1 | 2/2001 | Renz et al. |
| 6,207,761 | B1 | 3/2001 | Smith et al. |
| 6,238,801 | B1 | 5/2001 | Naoumenko et al. |
| 6,245,915 | B1 | 6/2001 | Wood et al. |
| 6,265,054 | B1 | 7/2001 | Bravet et al. |
| 6,268,415 | B1 | 7/2001 | Renz et al. |
| 6,319,596 | B1 | 11/2001 | Kernander et al. |
| 6,320,116 | B1 | 11/2001 | Hanoka |
| 6,353,042 | B1 | 3/2002 | Hanoka et al. |
| 6,432,522 | B1 | 8/2002 | Friedman et al. |
| 6,455,161 | B1* | 9/2002 | Regnier et al. .............. 428/412 |
| 6,500,888 | B2 | 12/2002 | Baumgartner et al. |
| 6,518,365 | B1 | 2/2003 | Powell et al. |
| 6,586,271 | B2 | 7/2003 | Hanoka |
| 6,690,930 | B1 | 2/2004 | Dupre |
| 6,699,027 | B2 | 3/2004 | Murphy et al. |
| 6,737,151 | B1 | 5/2004 | Smith |
| 6,852,792 | B1 | 2/2005 | Capendale et al. |
| 6,866,158 | B1 | 3/2005 | Sommer et al. |
| 7,005,098 | B2 | 2/2006 | Caballaro et al. |
| 7,128,864 | B2 | 10/2006 | Kennedy, III et al. |
| 7,189,457 | B2 | 3/2007 | Anderson |
| 7,201,672 | B2 | 4/2007 | Yamagishi et al. |
| 7,763,360 | B2 | 7/2010 | Paul et al. |
| 7,951,865 | B1 | 5/2011 | Paul et al. |
| 2002/0155302 | A1 | 10/2002 | Smith et al. |
| 2002/0175136 | A1 | 11/2002 | Bouix et al. |
| 2002/0180083 | A1 | 12/2002 | Yaniger |
| 2003/0000568 | A1 | 1/2003 | Gonsiorawski |
| 2003/0044579 | A1 | 3/2003 | Bolton et al. |
| 2003/0124296 | A1 | 7/2003 | Smith |
| 2004/0011755 | A1 | 1/2004 | Wood |
| 2004/0144415 | A1 | 7/2004 | Arhart |
| 2004/0176531 | A1 | 9/2004 | Morgan et al. |
| 2005/0058498 | A1 | 3/2005 | Botto et al. |
| 2005/0129888 | A1 | 6/2005 | Kwon |
| 2005/0279401 | A1 | 12/2005 | Arhart et al. |
| 2006/0043632 | A1 | 3/2006 | Anderson |
| 2006/0057392 | A1 | 3/2006 | Smillie et al. |
| 2006/0084763 | A1 | 4/2006 | Arhart et al. |
| 2006/0141212 | A1 | 6/2006 | Smith et al. |
| 2006/0165929 | A1 | 7/2006 | Lenges et al. |
| 2006/0182983 | A1 | 8/2006 | Paul et al. |
| 2006/0273485 | A1 | 12/2006 | Higuchi et al. |
| 2007/0092706 | A1* | 4/2007 | Pesek et al. .............. 428/220 |
| 2007/0221268 | A1 | 9/2007 | Hasch |
| 2007/0282069 | A1 | 12/2007 | Egashira et al. |
| 2007/0289693 | A1* | 12/2007 | Anderson et al. .............. 156/99 |
| 2008/0017241 | A1 | 1/2008 | Anderson et al. |
| 2008/0023063 | A1 | 1/2008 | Hayes et al. |
| 2008/0023064 | A1 | 1/2008 | Hayes et al. |
| 2008/0044666 | A1 | 2/2008 | Anderson et al. |
| 2008/0269388 | A1 | 10/2008 | Markovich et al. |
| 2009/0023867 | A1 | 1/2009 | Nishijima et al. |
| 2009/0120489 | A1 | 5/2009 | Nishijima et al. |
| 2009/0297747 | A1 | 12/2009 | Hausmann et al. |
| 2010/0166991 | A1 | 7/2010 | Hausmann et al. |
| 2010/0166992 | A1 | 7/2010 | Hausmann et al. |

FOREIGN PATENT DOCUMENTS

| | | | |
|---|---|---|---|
| DE | 4316622 A1 | 11/1993 | |
| DE | 4316876 A1 | 11/1993 | |
| EP | 0157030 B1 | 10/1985 | |
| EP | 0483087 A1 | 4/1991 | |
| EP | 0589839 B1 | 9/1993 | |
| EP | 0591102 B1 | 9/1993 | |
| EP | 0855155 B1 | 12/1996 | |
| EP | 1816147 A1 | 11/2005 | |
| JP | 1990094574 A | 5/1990 | |
| JP | 1991510646 B2 | 11/1994 | |
| JP | 1994322334 A | 11/1994 | |
| JP | 1996316508 A | 11/1996 | |
| JP | 1999026791 A | 1/1999 | |
| JP | 2000186114 A | 7/2000 | |
| JP | 2001031801 A | 2/2001 | |
| JP | 2001089616 A | 4/2001 | |
| JP | 2001119047 A | 4/2001 | |
| JP | 2001119056 A | 4/2001 | |
| JP | 2001119057 A | 4/2001 | |
| JP | 2001144313 A | 5/2001 | |
| JP | 2004031445 A | 1/2004 | |
| JP | 2005034913 A | 2/2005 | |
| JP | 2005064266 A | 3/2005 | |
| JP | 2005064268 A | 3/2005 | |
| JP | 2006032308 A | 2/2006 | |
| JP | 2006036874 A | 2/2006 | |
| JP | 2006036875 A | 2/2006 | |
| JP | 2006036876 A | 2/2006 | |
| JP | 2006186237 A | 7/2006 | |
| JP | 2006190865 A | 7/2006 | |
| JP | 2006190867 A | 7/2006 | |
| WO | 9904971 A2 | 2/1999 | |
| WO | 9958334 A2 | 11/1999 | |
| WO | 0063309 A1 | 10/2000 | |
| WO | 0064670 A1 | 11/2000 | |
| WO | 02051916 A2 | 7/2002 | |
| WO | 03045186 A1 | 6/2003 | |
| WO | 2004011755 A1 | 2/2004 | |
| WO | 2004062881 A1 | 7/2004 | |
| WO | 2006002389 A1 | 1/2006 | |
| WO | 2006057771 A2 | 6/2006 | |
| WO | 2006085603 A1 | 8/2006 | |
| WO | 2006095762 A1 | 9/2006 | |
| WO | 2008010597 A1 | 1/2008 | |

OTHER PUBLICATIONS

UserCom "The advantage of DSC cooling measurements for characterizing materials", Feb. 2004.*

Hasch et al., "High Pressure Phase Behavior of Mixtures of Poly(Ethylene-Co-Methyl Acrylate) With Law Molecular Weight Hyrdrocarbons", Journal of Polymer Science: Part B: Polymer Physics, 1992, 1365-1373, vol. 30.

Longworth, R., "Ionic Polymers", L. Holliday, Ed., 1975, Chapter 2, Halstead, New York (Book Not Included).

Morris, Barry., "The Stiffness of Ionomers: How It Is Achieved and Its Importance to Flexible Packaging Applications", J.C. Sep Antec, 2003, 3157, 61 (vol. 3).

Suh et al., Charge Behavior in Polyethylene-Ionomer Blends, IEEE Transactions on Dielectrics and Electrical Insulation, 1997, pp. 58-63, vol. 4, No. 1, IEEE Service Center, Piscataway, NJ, US.

PCT International Search Report and Written Opinion for International Application No. PCT/US2009/062927, Filed Nov. 2, 2009, Dated Dec. 30, 2009.

PCT International Preliminary Report on Patentability for International Application No. PCT/US2009/62927, Filed Nov. 2, 2009, Dated Jun. 21, 2011.

PCT International Preliminary Report on Patentability for International Application No. PCT/US09/62932 Dated Jun. 22, 2011.

PCT International Preliminary Report on Patentability for International Application No. PCT/US09/62940 Dated Jun. 21, 2011.

ASTM International Designation D 3418-99, Standard Test Method for Transition Temperatures of Polymers by Differential Scanning Calorimetry, 1999.

ASTM International Designation D3418-03, Standard Test Method for Transition Temperatures and Enthalpies of Fusion and Crystallization of Polymers by Differential Scanning Calorimetry, 2003.

ASTM International Designation D3418-08, Standard Test Method for Transition Temperatues and Enthalpies of Fusion and Crystallization of Polymers by Differential Scanning Calorimetry, 2008.

ASTM International Designation D3417-99, Standard Test Method for Enthalpies of Fusion and Crystallization of Polymers by Differential Scanning Calorimetry (DSC), 1999.

* cited by examiner

HIGH-CLARITY IONOMER COMPOSITIONS AND ARTICLES COMPRISING THE SAME

CROSS-REFERENCE TO RELATED APPLICATION

This application claims priority under 35 U.S.C. §120 to U.S. Provisional Appln. No. 61/110,302, filed on Oct. 31, 2008, and U.S. Provisional Appln. No. 61/117,645, filed on Nov. 25, 2008, each of which is incorporated herein by reference in its entirety.

FIELD OF THE INVENTION

The present invention relates to certain ionomer compositions and articles, e.g., injection molded articles, made therefrom.

BACKGROUND OF THE INVENTION

Several patents and publications are cited in this description in order to more fully describe the state of the art to which this invention pertains. The entire disclosure of each of these patents and publications is incorporated by reference herein.

Ionomers are copolymers produced by partially or fully neutralizing the carboxylic acid groups of precursor or parent polymers that are acid copolymers comprising copolymerized residues of $\alpha$-olefins and $\alpha,\beta$-ethylenically unsaturated carboxylic acids. A variety of articles made from ionomers by injection molding processes have been used in our daily life.

For example, golf balls with ionomer covers have been produced by injection molding. See, e.g.; U.S. Pat. Nos. 4,714,253; 5,439,227; 5,452,898; 5,553,852; 5,752,889; 5,782,703; 5,782,707; 5,803,833; 5,807,192; 6,179,732; 6,699,027; 7,005,098; 7,128,864; 7,201,672; and U.S. Patent Appln. Publn. Nos. 2006/0043632; 2006/0273485; and 2007/0282069.

Ionomers have also been used to produce injection molded hollow articles, such as containers. See, e.g. U.S. Pat. Nos. 4,857,258; 4,937,035; 4,944,906; 5,094,921; 5,788,890; 6,207,761; and 6,866,158, U.S. Patent Publication Nos. 20020180083; 20020175136; and 20050129888, European Patent Nos. EP1816147 and EP0855155, and PCT Patent Publn. Nos. WO2004062881; WO2008010597; and WO2003045186.

Containers produced by injection molding often have thick wall structures. When ionomers are used in forming such injection molded containers, the optical properties may suffer due to the thickness of the wall. There is a need, especially in the cosmetics industry, to develop containers that are made of ionomer compositions and that have improved optical properties.

SUMMARY OF THE INVENTION

Accordingly, provided herein is a composition comprising an ionomer that is the neutralized product of a precursor acid copolymer, wherein (A) the precursor acid copolymer comprises copolymerized units of an $\alpha$-olefin having 2 to 10 carbon atoms and about 20 to about 30 wt %, based on the total weight of the precursor acid copolymer, of copolymerized units of an $\alpha,\beta$-ethylenically unsaturated carboxylic acid having 3 to 8 carbon atoms; (B) the precursor acid copolymer has a melt flow rate of about 70 to about 1000 g/10 min; and (C) the precursor acid copolymer, when neutralized to a level of about 40% to about 90% and when comprising counterions that consist essentially of sodium cations, produces a sodium ionomer, and said sodium ionomer has a melt flow rate of about 0.7 to about 25 g/10 min and a freeze enthalpy that is not detectable or that is less than about 3.0 j/g, when determined by differential scanning calorimetry (DSC) in accordance with ASTM D3418.

Further provided are articles, such as injection-molded articles, comprising the ionomer composition.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

The term "a finite amount", as used herein, refers to an amount that is greater than zero.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

The terms "freeze enthalpy", "heat of crystallization" and "enthalpy of crystallization", as used herein, are synonymous and interchangeable. The terms "heat of crystallization" and "enthalpy of crystallization" are defined in ASTM Method No. D3418, published on December, 2008.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an $\alpha$-olefin, an $\alpha,\beta$-ethylenically unsaturated carboxylic acid, and optionally other suitable comonomer(s) such as, an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a zinc/sodium mixed ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates.

Provided herein is an ionomer composition comprising an ionomer that is an ionic, neutralized derivative of a precursor acid copolymer. The precursor acid copolymer comprises copolymerized units of an $\alpha$-olefin having 2 to 10 carbons and copolymerized units of an $\alpha,\beta$-ethylenically unsaturated carboxylic acid having 3 to 8 carbons. Preferably, the precursor acid copolymer comprises about 20 to about 30 wt %, or about 20 to about 25 wt %, based on the total weight of the precursor acid copolymer, of the copolymerized carboxylic acid. The amount of copolymerized $\alpha$-olefin is complementary to the amount of copolymerized carboxylic acid and other comonomers, if present, so that the sum of the weight percentages of the comonomers in the precursor acid copolymer is 100 wt %.

Suitable $\alpha$-olefin comonomers include, but are not limited to, ethylene, propylene, 1-butene, 1-pentene, 1-hexene, 1-heptene, 3 methyl-1-butene, 4-methyl-1-pentene, and the like and combinations of two or more of these $\alpha$-olefins. Preferably, the $\alpha$-olefin is ethylene.

Suitable $\alpha,\beta$-ethylenically unsaturated carboxylic acid comonomers include, but are not limited to, acrylic acids, methacrylic acids, itaconic acids, maleic acids, maleic anhydrides, fumaric acids, monomethyl maleic acids, and combinations of two or more of these acid comonomers. Preferably, the $\alpha,\beta$-ethylenically unsaturated carboxylic acid monomers are selected from acrylic acids, methacrylic acids, and combinations of two or more (meth)acrylic acids.

The precursor acid copolymers may further comprise copolymerized units of other comonomer(s), such as unsaturated carboxylic acids having 2 to 10, or preferably 3 to 8 carbons, or derivatives thereof. Suitable acid derivatives include acid anhydrides, amides, and esters. Esters are preferred. Specific examples of preferred esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylates, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol)methyl ether acrylates, poly(ethylene glycol)methyl ether methacrylates, poly(ethylene glycol) behenyl ether acrylates, poly(ethylene glycol)behenyl ether methacrylates, poly(ethylene glycol) 4-nonylphenyl ether acrylates, poly(ethylene glycol) 4-nonylphenyl ether methacrylates, poly(ethylene glycol)phenyl ether acrylates, poly(ethylene glycol)phenyl ether methacrylates, dimethyl maleates, diethyl maleates, dibutyl maleates, dimethyl fumarates, diethyl fumarates, dibutyl fumarates, vinyl acetates, vinyl propionates, and combinations of two or more thereof. Examples of preferred comonomers include, but are not limited to, methyl(meth)acrylates, butyl(meth)acrylates, glycidyl methacrylates, vinyl acetates, and combinations of two or more thereof. Preferably, however, the precursor acid copolymer does not incorporate other comonomers in any significant amount.

Combinations of precursor acid copolymers are also suitable, provided that the properties of the copolymers are within the ranges described herein. For example, two or more dipolymers having differing amounts of copolymerized carboxylic acid comonomer or differing melt indices may be used. Also, a combination of precursor acid copolymers including a dipolymer and a terpolymer may be suitable.

The precursor acid copolymer may have a melt flow rate (MFR) of about 10 to about 4000 g/10 min, about 10 to about 2500 g/10 min, about 10 to about 1400 g/10 min, about 35 to about 1200 g/10 min, about 70 to about 1000 g/10 min, about 100 to about 500 g/10 min, or about 200 to about 500 g/10 min, as determined in accordance with ASTM method D1238 at 190° C. and under a weight of 2.16 kg.

The precursor acid copolymers may be synthesized in a continuous process in which each of the reactive comonomers and the solvent or solvents, if any, are continuously fed, together with initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor acid copolymer, the reaction temperature may be maintained at about 120° C. to about 300° C., or about 140° C. to about 260° C. The pressure in the reactor may be maintained at about 130 to about 310 MPa, or about 165 to 250 MPa.

The reactor may be, for example, an autoclave such as those described in U.S. Pat. No. 2,897,183. Specifically, U.S. Pat. No. 2,897,183 describes a type of autoclave that is equipped with means for intensive agitation. It also describes a continuous process for the polymerization of ethylene under a "substantially constant environment." This environment is maintained by keeping certain parameters, for example, pressure, temperature, initiator concentration and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the ethylene copolymer product, is vigorously agitated and continuously removed from the autoclave. After the reaction mixture leaves the reaction vessel, the resulting ethylene copolymer product is separated from the volatile unreacted monomers and solvents, if any, by conventional procedures, such as by vaporizing the unpolymerized materials and solvents under reduced pressure or at an elevated temperature.

In general, to obtain the ionomers described herein, during the polymerization reaction, the reactor contents should be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons", Journal of Polymer Science: Part B: Polymer Physics, Vol. 30, 1365-1373 (1992), describe a cloud-point measurement that can be used in determining the boundary between single-phase and multiphase conditions.

To obtain the ionomers useful in the ionomer compositions described herein, the precursor acid copolymers are neutralized with a base so that the carboxylic acid groups in the precursor acid copolymer react to form carboxylate groups. Preferably, the precursor acid copolymers groups are neutralized to a level of about 20 to about 90%, or about 30% to about 90%, or about 35% to about 90%, or about 40% to about 90%, or about 40% to about 70%, or about 43% to about 60%, based on the total carboxylic acid content of the precursor acid copolymers as calculated or as measured for the non-neutralized precursor acid copolymers.

Any stable cation and any combination of two or more stable cations are believed to be suitable as counterions to the carboxylate groups in the ionomer. Divalent and monovalent cations, such as cations of alkali metals, alkaline earth metals, and some transition metals, are preferred. Zinc is a preferred divalent cation. Monovalent cations are more preferred. Still more preferably, the base is a sodium ion-containing base, to provide a sodium ionomer wherein about 40% to about 90%, or about 40% to about 70%, or about 43% to about 60% of the hydrogen atoms of the carboxylic acid groups of the precursor acid are replaced by sodium cations.

To obtain the ionomers used herein, the precursor acid copolymers may be neutralized by any conventional procedure, such as those described in U.S. Pat. Nos. 3,404,134 and 6,518,365.

When the precursor acid copolymer is neutralized by a sodium ion-containing base to a degree of about 40% to about 90%, or about 40% to about 70%, or about 43% to about 60%, the as-neutralized sodium ionomer may have a MFR of about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg. Further, the as-neutralized sodium ionomer may have a freeze enthalpy that is not detectable or less than about 3 j/g, or less than about 2 j/g, as determined by differential scanning calorimetry (DSC) in accordance with ASTM method D3418 when using a DSC apparatus manufactured by Mettler or by TA (for example the Universal V3.9A model). The term "not detectable", as used in this context, refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 j/g is not detectable.

The ionomer composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities that are generally from 0.01 to 15 weight %, preferably from 0.01 to 10 weight %, so long as they do not detract from the basic and novel characteristics of the composition and do not significantly adversely affect the performance of the composition or of the articles prepared from the composition. In this connection, the weight percentages of such additives are not included in the total weight percentages of the ionomer compositions defined herein. Typically, such additives may be present in amounts of from 0.01 to 5 weight %, based on the total weight of the ionomer composition. The optional incorporation of such conventional ingredients into the compositions can be carried out by any known process, for example, by dry blending, by extruding a mixture of the various constituents, by a masterbatch technique, or the like. See, again, the *Kirk-Othmer Encyclopedia*.

Three notable additives are thermal stabilizers, UV absorbers and HALS. Thermal stabilizers can be used and have been widely described in the art. Any known thermal stabilizer may find utility in the ionomer compositions described herein. Preferred classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds that destroy peroxide, hydroxylamines, nitrones, thiosynergists, benzofuranones, indolinones, and the like and combinations of two or more thereof. The ionomer compositions may contain any effective amount of thermal stabilizer(s). Use of a thermal stabilizer is optional and in some instances is not preferred. When one or more thermal stabilizers are used, they may be present in the ionomer compositions at a level of at least about 0.05 wt %, and up to about 10 wt %, more preferably up to about 5 wt %, and still more preferably up to about 1 wt %, based on the total weight of the ionomer composition.

UV absorbers can be used and have also been widely described in the art. Any known UV absorber may find utility in the ionomer compositions described herein. Preferred classes of UV absorbers include, but are not limited to, benzotriazoles, hydroxybenzophenones, hydroxyphenyl triazines, esters of substituted and unsubstituted benzoic acids, and the like and combinations of two or more thereof. The ionomer compositions may contain any effective amount of one or more UV absorbers. Use of an UV absorber is optional and in some instances is not preferred. When UV absorber(s) are used, they may be present in the ionomer compositions at a level of at least about 0.05 wt %, and up about 10 wt %, more preferably up to about 5 wt %, and still more preferably up to about 1 wt %, based on the total weight of the ionomer composition.

Hindered amine light stabilizers can be used and have also been widely described in the art. Generally, hindered amine light stabilizers are secondary or tertiary, acetylated, N hydrocarbyloxy-substituted, hydroxyl-substituted, N-hydrocarbyloxy substituted, or other substituted cyclic amines which further incorporate steric hindrance, generally derived from aliphatic substitution on the carbon atoms adjacent to the amine function. The ionomer compositions may contain any effective amount of one or more hindered amine light stabilizers. Use of hindered amine light stabilizers is optional and in some instances is not preferred. When hindered amine light stabilizer(s) are used, they may be present in the ionomer compositions at a level of at least about 0.05 wt %, and up to about 10 wt %, more preferably up to about 5 wt %, and still more preferably up to about 1 wt %, based on the total weight of the ionomer composition.

Further provided are articles comprising the ionomer compositions described herein. Articles comprising or made from these ionomer compositions exhibit equal or better optical properties (e.g., equal or lower haze as determined in accordance with ASTM D1003) than those made from prior art ionomers. Moreover, the improved optical properties are not affected by the cooling rate that follows the process of fabricating the article.

More specifically, the ionomer compositions described herein are thermoplastic. Accordingly, articles comprising these compositions are most often formed by processes that include the step of melting the ionomer and the other components of the ionomer composition, and the step of shaping the desired article from the polymer melt. At the end of the fabrication process, thicker articles may be cooled to room temperature at a slower rate due to the limitations of heat transfer or due to economic limitations that prevent the use of expensive cooling equipment. In general, however, a slow cooling rate is unfavorable for the optical properties of ionomers. Without wishing to be held to theory, it is believed that ethylene acid copolymers and their ionomers may have a high degree of inhomogeneity (non-randomness or "blockiness") in the comonomer distribution along the length of the polymer chain. The result is that these materials include long stretches of consecutively copolymerized ethylene residues that are capable of organization into crystals, just as polyethylene itself has a well-known tendency to crystallize. See, for example, Longworth, R., in *Ionic Polymers* (L. Holliday, ed.), Halstead, New York, Ch. 2 (1975); and Morris, B. A., Chen, J. C. SEP ANTEC, 61(Vol. 3), 3157 (2003). Crystals above a certain size scatter light that would otherwise be transmitted through the article. Therefore, good optical properties, such as haze and clarity, deteriorate as crystallinity increases.

In contrast, the ionomer compositions described herein have good optical properties, even when cooled at very low rates. The exceptionally small or even unmeasurable freeze enthalpies of the ionomers described herein are evidence that these ionomers have no tendency, an insignificant tendency, or a very low tendency towards crystallization. Again without wishing to be held to theory, it is believed that this favorable tendency is the result of a higher degree of homogeneity (that is, randomness or "non-blockiness") in the comonomer distribution along the length of the polymer chain of the ionomers described herein.

Returning now to the description of the article provided herein, this article may be in any shape or form, such as a film, a sheet or a molded article.

In one embodiment, the article is a film or sheet, which may be prepared by any conventional process, such as dipcoating, solution casting, lamination, melt extrusion, blown film, extrusion coating, tandem extrusion coating, or by any other procedures that are known to those of skill in the art. The films or sheets are preferably formed by melt extrusion, melt coextrusion, melt extrusion coating, blown film, or by a tandem melt extrusion coating process.

Alternatively, the articles comprising the ionomer compositions described herein are molded articles, which may be prepared by any conventional molding process, such as compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding.

Information about these fabrication methods may be found in reference texts such as, for example, the *Kirk Othmer Encyclopedia*, the *Modern Plastics Encyclopedia*, McGraw-Hill (New York, 1995) or the *Wiley Encyclopedia of Packaging Technology*, 2d edition, A. L. Brody and K. S. Marsh, Eds., Wiley-Interscience (Hoboken, 1997).

In another alternative, the article comprising the ionomer composition described herein is an injection molded article having a minimum thickness (i.e, the thickness at the smallest dimension of the article) of at least about 1 mm. Preferably, the injection molded article may have a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a multi-layer structure, such as an over-molded article, wherein at least one layer of the multi-layer structure comprises or consists essentially of the ionomer composition described above and that layer has a minimum thickness of at least about 1 mm. Preferably, the at least one layer of the multi-layer article has a thickness of about 1 mm to 100 mm, or 2 mm to 100 mm, or about 3 to about 100 mm, or about 3 to about 50 mm, or about 5 to about 35 mm.

In yet another alternative, the article is an injection molded article in the form of a sheet, a container (e.g., a bottle or a bowl), a cap or stopper (e.g. for a container), a tray, a medical device or instrument (e.g., an automated or portable defibrillator unit), a handle, a knob, a push button, a decorative article, a panel, a console box, or a footwear component (e.g., a heel counter, a toe puff, or a sole).

In yet another alternative, the article is an injection molded intermediate article for use in further shaping processes. For example, the article may be a pre-form or a parison suitable for use in a blow molding process to form a container (e.g., a cosmetic container). The injection molded intermediate article may be in the form of a multi-layer structure such as the one described above, and it may therefore produce a container having a multi-layer wall structure.

Injection molding is a well-known molding process. When the article described herein is in the form of an injection molded article, it may be produced by any suitable injection molding process. Suitable injection molding processes include, for example, co-injection molding and over-molding. These processes are sometimes also referred to as two-shot or multi-shot molding processes.

When the injection molded article is produced by an over-molding process, the ionomer composition may be used as the substrate material, the over-mold material or both. In certain articles, when an over-molding process is used, the ionomer composition described herein may be over-molded on a glass, plastic or metal container. Alternatively, the ionomer compositions may be over-molded on any other articles (such as household items, medical devices or instruments, electronic devices, automobile parts, architectural structures, sporting goods, etc.) to form a soft touch and/or protective overcoating. When the over-mold material comprises the ionomer composition described herein, the melt index of the ionomer is preferably from 0.1 g/10 min or 0.75 g/10 min or 5 g/10 min up to about 35 g/10 min, as determined in accordance with ASTM D1238 at 190° C. and 2.16 kg.

In fabrication processes that incorporate a form of blow molding, such as, for example, injection blow molding, injection stretch blow molding and extrusion blow molding, and in substrates or monolayer articles that comprise the ionomer composition, the ionomer composition preferably comprises an ionomer having zinc cations. When the overmolding material comprises the ionomer composition, however, the ionomer may comprise any suitable cation. Also preferably, the precursor acid copolymer preferably has a melt index of 200 to 500 g/10 min, as determined in accordance with ASTM D1238 at 190° C. and 2.16 kg. In addition, the ionomer preferably has a melt index of from about 0.1 to about 2.0 g/10 min or from about 0.1 to about 35 g/10 min, as determined in accordance with ASTM D1238 at 190° C. and 2.16 kg. More specifically, when the substrate comprises the ionomer, the ionomer preferably has a melt index of about 0.5 to about 4 g/10 min. When the overmolding material comprises the ionomer, however, the ionomer preferably has a melt index of from 0.1 g/10 min or 0.75 g/10 min or 4 g/10 min or 5 g/10 min up to about 35 g/10 min.

The ionomer composition may be molded at a melt temperature of about 120° C. to about 250° C., or about 130° C. to about 210° C. In general, slow to moderate fill rates with pressures of about 69 to about 110 MPa may be used. The mold temperatures may be in the range of about 5° C. to about 50° C., preferably 5° C. to 20° C., and more preferably 5° C. to 15° C. Based on the ionomer composition and the process type that is to be used, one skilled in the art would be able to determine the proper molding conditions required to produce a particular type of article.

The following examples are provided to describe the invention in further detail. These examples, which set forth a preferred mode presently contemplated for carrying out the invention, are intended to illustrate and not to limit the invention.

EXAMPLES

Example E1 to E3 and Comparative Examples CE1 to CE16

The ionomers used in each of the following examples were prepared as follows. First, the precursor acid copolymers (i.e., the unneutralized copolymers of ethylene and methacrylic acid) were produced by a free radical polymerization in an adiabatic continuous stirred autoclave, substantially according to the procedure described in Example 1 of U.S. Pat. No. 5,028,674, with the following exceptions: (1) by controlling the ratio of ethylene to methacrylic acid and the flow rate of the initiator, the reactor conditions were maintained at a temperature of about 200° C. to about 260° C. and at a pressure of between 170 and 240 MPa; (2) no propane telogen was fed in the reactor (except in CE13); (3) the total concentration of methanol in the reactor was maintained at about 2 to 5 mol %, based on the total feed of ethylene, methacrylic acid, methanol and initiator solution (or based on the total feed of propane telogen, ethylene, methacrylic acid, methanol, and initiator solution in CE13); and (4) the system was maintained at a steady state with the residence time of the material flowing through the reactor being about 5 seconds to 2 minutes. In addition, depending on the particular acid copolymer to be synthesized, one of two different free-radical initiators were used, tert-butyl peracetate or tert-butyl peroctoate. When tert-butyl peracetate was the initiator (as in Examples E1, E2, E3, CE1, CE2, CE3, CE13, and CE15), it was utilized as a solution in odorless mineral spirits at 50% concentration. When tert-butyl peroctoate was the initiator (as in Comparative Examples CE4, CE5, CE6, CE7, CE8, CE9, CE10, CE11, CE12, CE14, and CE16), it was utilized as a mixture at 90% concentration in odorless mineral spirits. The ionomers were obtained by partially neutralizing the precursor copolymers of ethylene and methacrylic acid with sodium hydroxide solution, either in a single screw extruder under high shear melt mixing conditions with the melt temperature set at 200° C. to 270° C., or using the general method described in Example 1 of U.S. Pat. No. 6,518,365.

The as-obtained ionomers then underwent differential scanning calorimetry (DSC) testing in accordance with ASTM D3418 with a temperature profile of (a) heating to 180° C.; (b) holding for 3 minutes; (c) cooling to 25° C. at a rate of 10° C./min; (d) holding for 3 minutes; and (e) heating to 180° C. at a rate of 10° C./min. The freeze enthalpies of the ionomers were determined and are reported in Table 1. The results demonstrate that the freeze enthalpies of each of the sodium ionomers described herein (Examples E1 to E3) were not detectable, while each of the prior art ionomers (Comparative Examples CE1 to CE16) has a freeze enthalpy greater than 3 j/g.

speed to maximum throughput, a 150 mm slot die with a nominal gap of 2 mm was fed by the extruder, the cast sheet was fed onto a 200 mm diameter polished chrome chill roll held at a temperature of between 10° C. and 15° C. and rotating at 1 to 2 rpm. The nominally 0.76 mm (30 mil) thick sheets were then removed and cut into 300×300 mm squares.

TABLE 2

| Extruder Zone | Temperature (° C.) |
|---|---|
| Feed | Ambient |
| Zone 1 | 100-170 |
| Zone 2 | 150-210 |
| Zone 3 | 170-230 |
| Adapter | 170-230 |
| Die | 170-230 |

The ionomer sheets were used as interlayer sheets to form glass laminates. Specifically, annealed glass sheets (100×100×3 mm) were washed with a solution of trisodium phosphate (5 g/l) in de-ionized water at 50° C. for 5 min, then rinsed thoroughly with de-ionized water and dried. Six sheets of each ionomer (about 0.76 mm thick) were stacked together and placed between the two lites of glass sheet to form a pre-lamination assembly having an interlayer with a total thickness of about 180 mils (4.57 mm). The moisture level of the ionomer sheets was kept below 0.06 wt % by minimizing their exposure to ambient conditions (~35% RH). The pre-lamination assembly was stabilized by the application of polyester tape in several locations to maintain relative positioning of each layer with the glass lites. A nylon fabric strip was placed around the periphery of the assembly to facilitate air removal from within the layers.

TABLE 1

| Example | Single Phase[1] | MAA (wt %)[2] | MFR (Base Resin)[3] | % Neut. (Sodium)[4] | MFR (Ionomer)[5] | Freeze Enthalpy (j/g) | Laminate Haze Cooling Rate A | Laminate Haze Cooling Rate B |
|---|---|---|---|---|---|---|---|---|
| E1 | Yes | 23 | 270 | 43 | 3.2 | n.d.[6] | 0.7 | 1.1 |
| E2 | Yes | 23 | 270 | 52 | 0.8 | n.d.[6] | 1.2 | 1.4 |
| E3 | Yes | 22 | 350 | 53 | 2.5 | n.d.[6] | 0.6 | 0.6 |
| CE1 | Yes | 23 | 270 | 33 | 8.2 | 3.13 | 0.9 | 9.8 |
| CE2 | Yes | 23 | 270 | 26 | 16.0 | 7.32 | 5.3 | 21.6 |
| CE3 | Yes | 23 | 270 | 14 | 40.0 | 21.97 | 5.1 | 59.1 |
| CE4 | No | 22 | 25 | 38 | 0.4 | 4.38 | 1.2 | 8.6 |
| CE5 | No | 22 | 25 | 30 | 0.9 | 13.36 | 3.4 | 11.9 |
| CE6 | No | 22 | 25 | 25 | 1.5 | 16.31 | 3.8 | 17.2 |
| CE7 | No | 22 | 25 | 20 | 2.3 | 20.95 | 3.2 | 23.5 |
| CE8 | No | 22 | 25 | 15 | 3.4 | 27.15 | 2.5 | 33.5 |
| CE9 | No | 22 | 30 | 32 | 1.2 | 10.18 | 1.9 | 10.8 |
| CE10 | No | 22 | 30 | 32 | 1.2 | 16.09 | 2.6 | 14.4 |
| CE11 | No | 22 | 25 | 26 | 1.8 | 14.22 | 1.8 | 18.7 |
| CE12 | No | 21 | 30 | 29 | 2.0 | 21.67 | 1.5 | 21.2 |
| CE13 | No | 20 | 350 | 49 | 3.2 | 4.4 | 1.1 | 12.5 |
| CE14 | No | 20 | 12 | 23 | 0.5 | 25.47 | 2.6 | 26.7 |
| CE15 | No | 19 | 225 | 45 | 4.5 | 10.81 | 3.1 | 27.5 |
| CE16 | No | 19 | 60 | 37 | 2.6 | 18.20 | 1.5 | 50.8 |

Notes for Table 1:
[1]During the polymerization process, a single phase was maintained substantially throughout the reactor;
[2]Weight percent of copolymerized units of methacrylic acid comprised in the precursor acid copolymer, from which the ionomer that forms the laminate interlayer sheet is derived;
[3]The melt flow rate (MFR) of the precursor acid copolymer was calculated based on the MFR of the ionomer;
[4]"% neut. Sodium" is the percentage of carboxylic acid groups present in the precursor acid copolymer which have been neutralized;
[5]The melt flow rate (MFR) of the ionomer, as determined in accordance with ASTM D1238 at 190° C. and 2.16 kg;
[6]"n.d." means that the freeze enthalpy is not detectable, when measured in accordance with ASTM D3418-03.

Further, the ionomers were fed into 25 mm diameter Killion extruders under the temperature profile set forth in Table 2 and extrusion cast into polymer sheets. Specifically, the polymer throughput was controlled by adjusting the screw The pre-lamination assembly was placed inside a nylon vacuum bag and sealed. A connection was made to a vacuum pump, and the air within the bagged assembly was substantially removed by reducing the air pressure inside the bag to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas.

The pre-pressed assembly was placed into an air autoclave and the temperature and pressure were increased from ambient to 135° C. and 13.8 bar over 15 min. The assembly was maintained at these conditions for 30 min, after which the resulting laminate was "fast cooled" (i.e., at Cooling Rate A of 2.5° C./min) to room temperature at ambient pressure. The as-obtained laminate was tested for haze in accordance with ASTM D1003 using a Haze-gard Plus hazemeter (BYK-Gardner, Columbia, Md.). After this measurement, the same laminate was heated up to 120° C. in an oven and maintained at such high temperature for 2 to 3 hours before it was "slow cooled" (i.e., Cooling Rate B of 0.1° C./min) to room temperature and then tested for haze.

As shown by the comparative examples (CE1 to CE16), the haze levels of glass laminates comprising prior art ionomer interlayer sheets are dependent on the cooling rate under which the laminates were obtained. In general, slower cooling rates increase the laminates' haze. As illustrated by Table 1, however, glass laminates comprising interlayer sheets made from the ionomers described herein (Examples E1 to E3) tend to have lower haze than those comprising prior art ionomer interlayer sheets (Comparative Examples CE1 to CE16). Moreover, the haze levels of laminates of Examples E1 to E3 were not affected by the cooling rate under which the laminates were obtained.

Example E4 and Comparative Example CE17

In Example E4 and Comparative Example CE17, the ionomers used in Example E3 and Comparative Example CE2, respectively, were injection molded into rectangular test bars with the dimension of 125×75×3 mm (thin test bars) or 125×45×20 mm (thick test bars) as follows. The resins were fed into a Model 150-6 HPM injection molding machine (Taylor's Industrial Services, Mount Gilead, Ohio). The ionomer melt temperature was in the range of 130° C. to 200° C. and the mold temperature was maintained at a temperature of about 10° C. The mold cycle time was approximately 90 seconds. These "air-cooled" test bars were obtained by ejecting the molded bars from the mold and allowing the molded bars to cool to room temperature (about 22±3° C.) under ambient conditions.

After the percent haze was determined in accordance with ASTM D1003 (reported in Table 3), the air-cooled thin test bars were re-heated in an air oven (at a temperature of 125° C.) for 90 min and then cooled at a rate of 0.1° C./min to room temperature. The haze of these "slow-cooled" test bars was determined in accordance with ASTM D1003, and the results of the measurements are reported in Table 3.

The clarity of the thick test bars was determined by visual inspection and ranked from 1 (highest clarity) to 5 (lowest clarity). These results are also reported in Table 3.

As demonstrated once more by the results in Table 3, molded articles made from the ionomer composition described herein exhibited improved clarity and less haze compared to the molded articles made from previously known ionomers. Additionally, the haze level of the molded articles made from the ionomer compositions described herein was not significantly affected by the cooling rate under which the article was obtained.

TABLE 3

| Example | Haze (%) Air-Cooled | Haze (%) Slow-Cooled | Clarity |
|---------|-----------|-------------|---------|
| E3      | 0.6       | 0.3         | 1       |
| CE2     | 1.5       | 11.7        | 2       |

Example E5 and Comparative Example CE18

Figure 1:
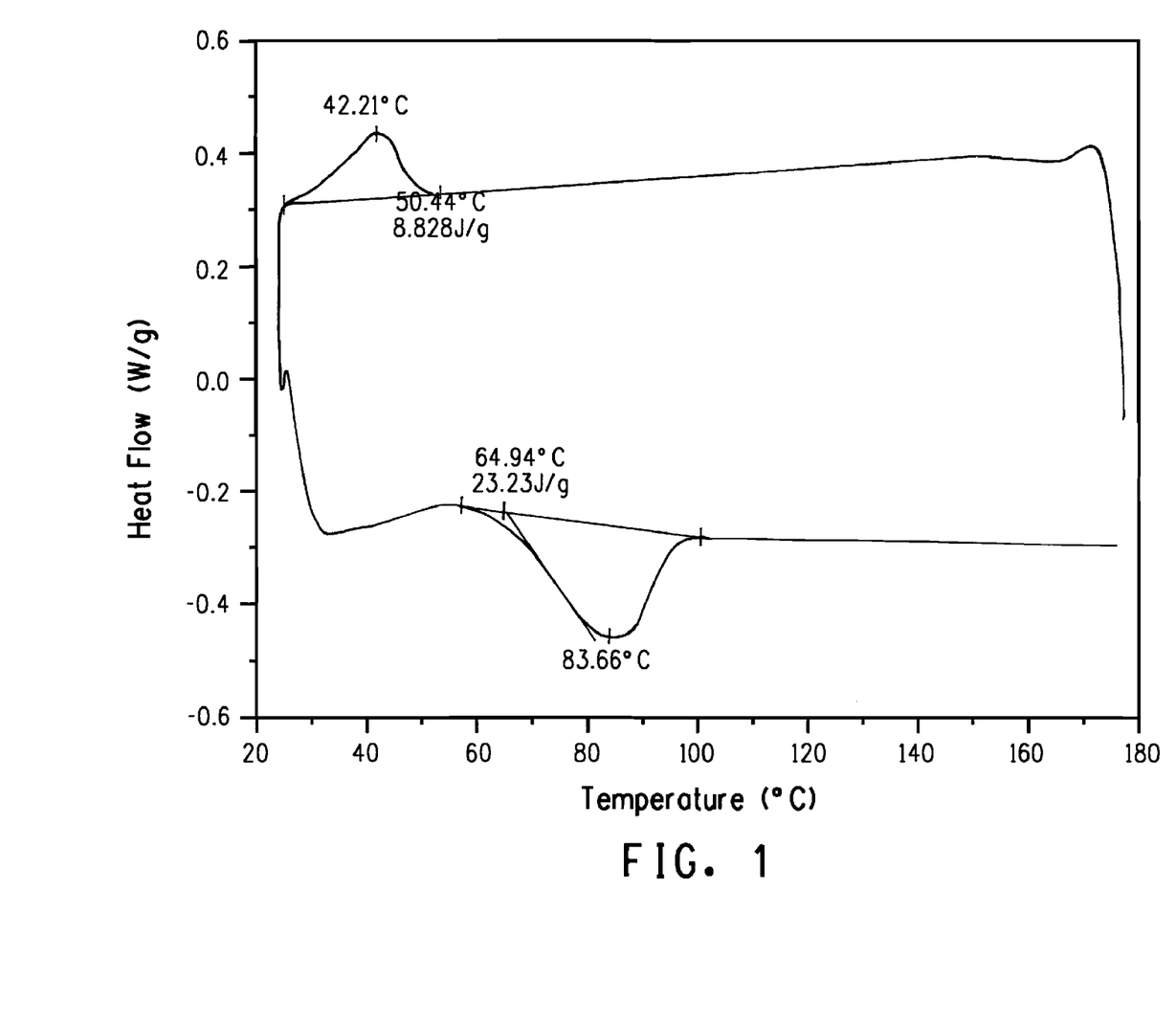
FIG. 1 is a trace of a differential scanning calorimetry (DSC) measurement of a prior art ionomer.
Figure 2:
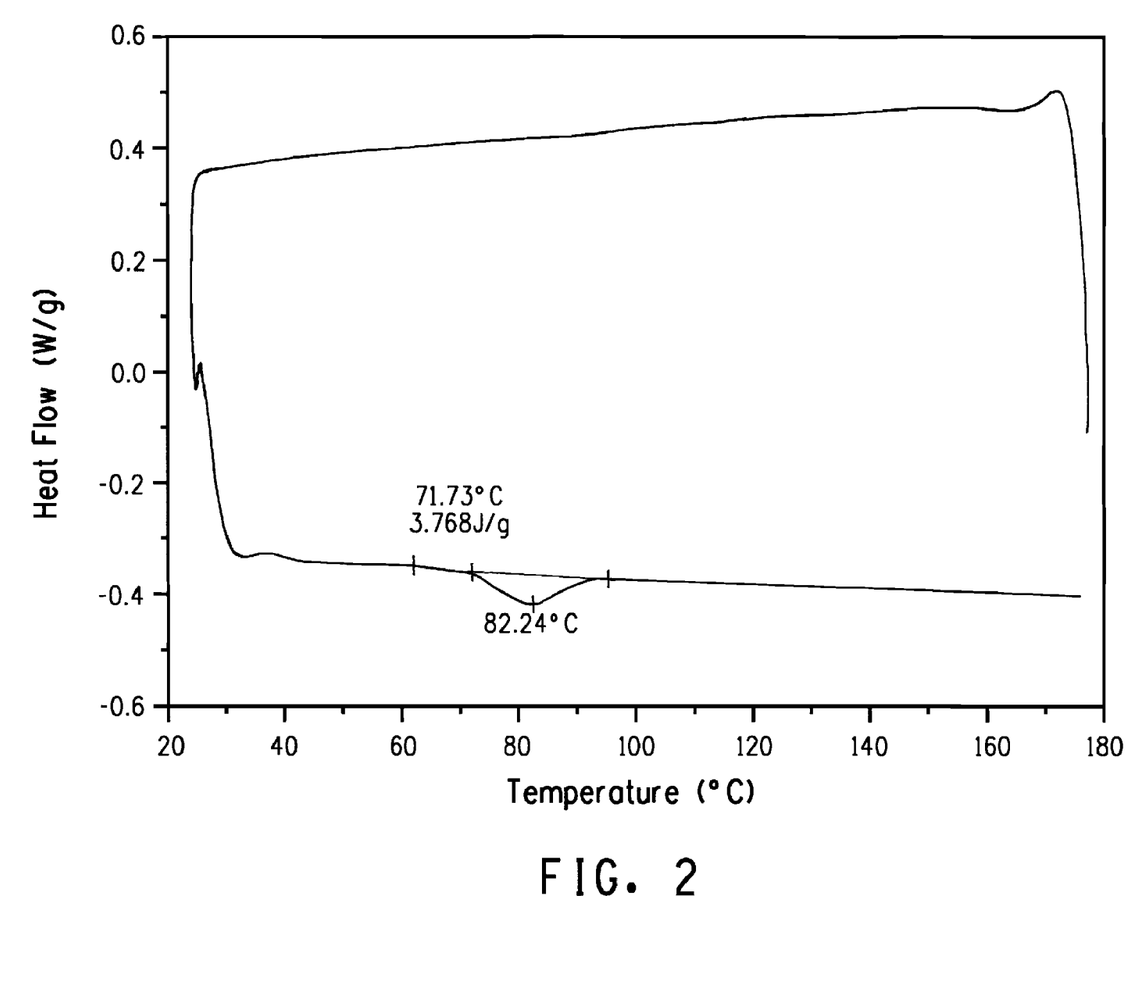
FIG. 2 is a DSC trace of an ionomer described herein.

The freeze enthalpies of an ionomer composition according to the invention and a prior art ionomer were determined by DSC, according to the methods described above. FIG. 1 shows the results of Comparative Example CE18. Specifically, FIG. 1 is the DSC trace of a prior art ionomer, clearly showing peaks corresponding to heat flow in and out of the ionomer sample. Integration of these peaks provides the freezing enthalpy or crystallization energy of the material. FIG. 2 shows the results of Example E5; specifically, it is the DSC trace of a sodium ionomer described herein. In contrast to the results shown in FIG. 1, the DSC trace in FIG. 2 shows that the sodium ionomer described herein has an insignificantly small or undetectable freezing enthalpy.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A precursor acid copolymer comprising:
    (A) copolymerized units of ethylene and about 20 to about 30 wt %, based on the total weight of the acid copolymer, of copolymerized units of an α,β-ethylenically unsaturated carboxylic acid selected from the group consisting of acrylic acid and methacrylic acid; wherein
    (B) the precursor acid copolymer has a melt flow rate of about 10 to about 4000 g/10 min, as determined in accordance with ASTM D1238 at 190° C. and 2.16 kg; and wherein
    (C) said precursor acid copolymer, being neutralized to a level of about 40% to about 90% based on the total number of the carboxylic acid groups present in the precursor acid copolymer, produces a sodium ionomer, said sodium ionomer comprising carboxylate groups and counterions, said counterions consisting essentially of sodium cations, and wherein the sodium ionomer has a melt flow rate of about 0.7 to about 25 g/10 min and a freeze enthalpy that is not detectable or that is less than about 3.0 j/g, as determined by differential scanning calorimetry in accordance with ASTM D3418.

2. An ionomer composition comprising an ionomer that is a neutralized product of the precursor acid copolymer of claim 1.

3. The ionomer composition of claim 2, wherein the precursor acid copolymer has a melt flow rate of about 100 to about 500 g/10 min.

4. The ionomer composition of claim 2, wherein precursor acid copolymer comprises about 20 to about 25 wt % of copolymerized units of the α,β-ethylenically unsaturated carboxylic acid.

5. The ionomer composition of claim 2, wherein about 40% to about 70% of the carboxylic acid groups present in the precursor acid copolymer have been neutralized by a sodium ion-containing base.

6. The ionomer composition of claim 2, wherein the ionomer has a melt flow rate of about 1 to about 10 g/10 min.

7. The ionomer composition of claim 2, wherein the ionomer has a freeze enthalpy that is not detectable.

8. An article comprising the ionomer composition of claim 2.

9. The article of claim 8, which is in the form of a film or a sheet or a molded article.

10. The article of claim 9, which is a film or sheet prepared by a process selected from the group consisting of dipcoating, solution casting, lamination, melt extrusion, blown film, extrusion coating, and tandem extrusion coating.

11. The article of claim 9, which is a molded article prepared by a process selected from the group consisting of compression molding, injection molding, extrusion molding, and blow molding.

12. The article of claim 11, which is an injection molded article.

13. The article of claim 12, having a minimum thickness of at least about 3 mm.

14. The article of claim 12, wherein the injection molded article has a multi-layer structure having at least one layer that consists essentially of the composition, said at least one layer having a minimum thickness of at least about 1 mm.

15. The article of claim 14 that is a container.

16. The article of claim 12 that is a sheet, a container, a cap or stopper, a tray, a medical device or instrument, a handle, a knob, a push button, a decorative article, a panel, a console box, or a footwear component.

17. The article of claim 12, which is produced by a process selected from the group consisting of co-injection molding; over-molding; injection blow molding; injection stretch blow molding and extrusion blow molding.

18. An article prepared by injection molding, said article consisting essentially of the ionomer composition of claim 2 and having a thickness of about 1 to about 100 mm.

19. The article of claim 17 that is produced by over-molding and wherein the ionomer has a melt flow rate of from about 0.75 to about 35 g/10 min.

20. The article of claim 17 that is produced by injection blow molding, injection stretch blow molding or extrusion blow molding; wherein the precursor acid copolymer has a melt index of about 200 to about 500 g/10 min; and the ionomer has a melt flow rate of from about 0.75 to about 35 g/10 min.

* * * * *